May 31, 1932.  L. L. JONES  1,860,362
PNEUMATIC TIRE
Filed Dec. 23, 1929
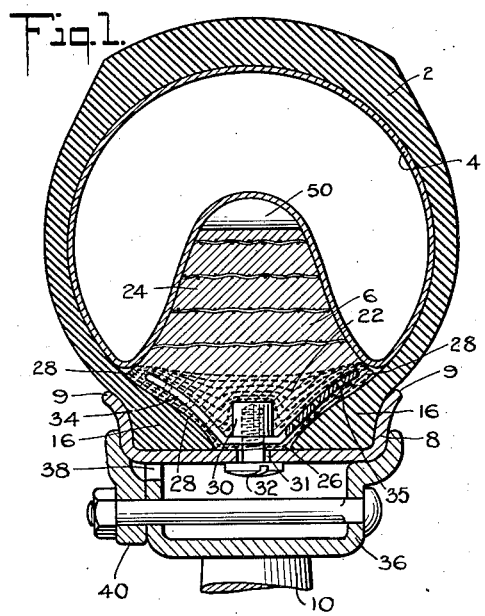
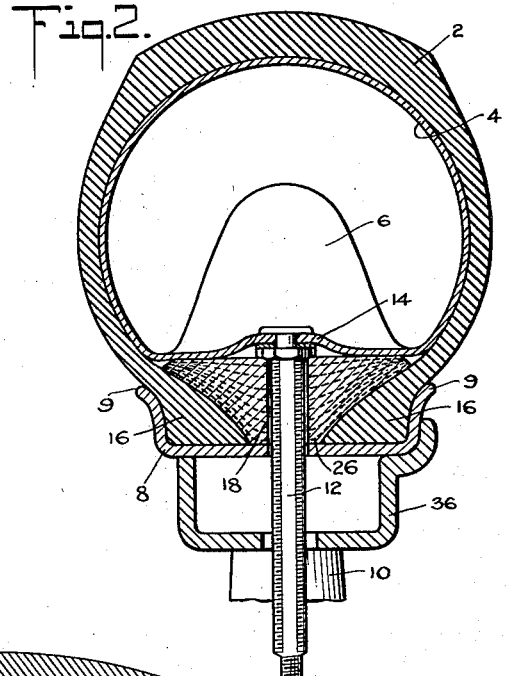
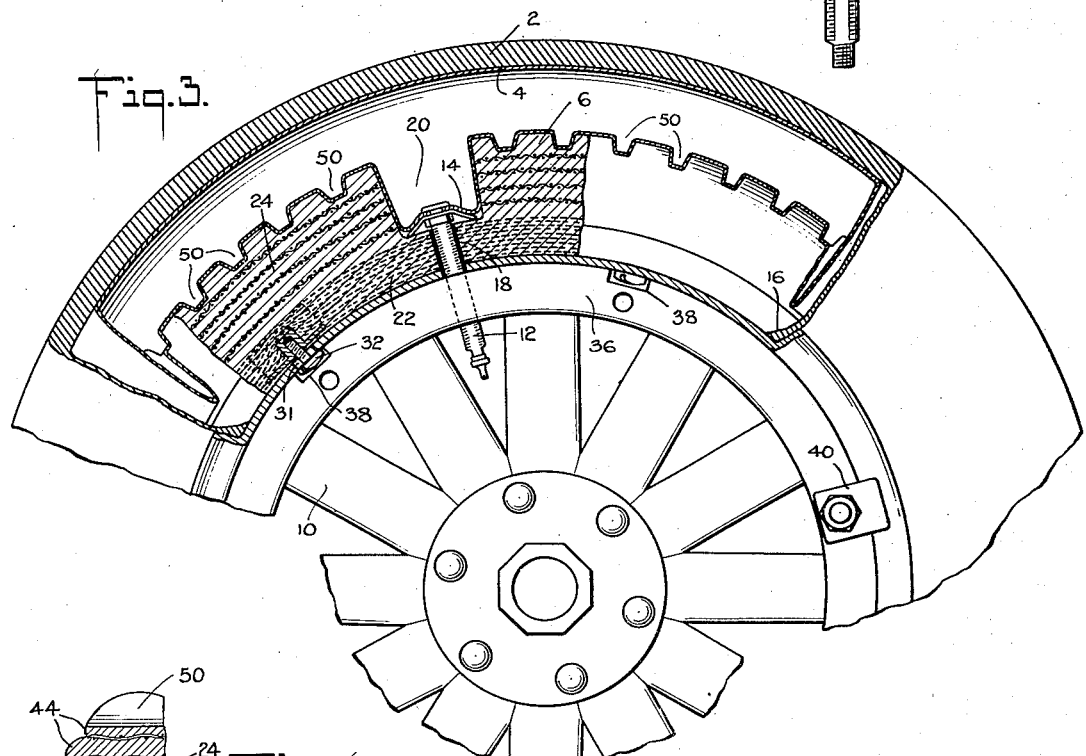
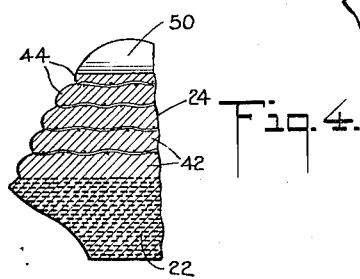
INVENTOR
Lester L. Jones
BY *Cavanagh & James*
ATTORNEYS Patented May 31, 1932

1,860,362

UNITED STATES PATENT OFFICE

LESTER L. JONES, OF ORADELL, NEW JERSEY

PNEUMATIC TIRE

Application filed December 23, 1929. Serial No. 416,001.

This invention relates to pneumatic tires, and more particularly to balloon tires and a safety buffer therefor.

The pneumatic tire most in use to-day is the low pressure, or so-called "balloon" tire. When such tires are deflated, due to a blowout or puncture, the vehicle tilts sharply because of the resulting decrease in effective diameter of the wheel. The deflated shoe is extremely loose on the wheel rim, and as the vehicle rolls on the "flat" shoe, the shoe tends to gather in front of the wheel, causing violent bumping, and tending to drag the shoe off the wheel rim. The deflated tire also causes a drag, and all of these factors lead to serious danger in the event of a sudden deflation while the vehicle is traveling at a high rate of speed. The danger is particularly pronounced when one of the front wheels is involved, because of the powerful tendency to swerve in direction created by the foregoing factors, particularly the extreme difference in front wheel diameters.

Even if the vehicle is running at a relatively slow rate of speed, considerable inconvenience results from the fact that on account of the tendency to gather or bunch in front of the wheel, and because of the relatively thin walls of a low pressure shoe, such a shoe cannot be run flat for even a short distance without seriously injuring the shoe. The urgent necessity of immediately changing the tire is frequently embarrassing as, for example, when the puncture occurs on a narrow road or a narrow bridge, or when the traveler would like to continue to a service station to have the shoe changed.

In general, the object of the present invention is to overcome the various foregoing difficulties which arise with pneumatic tires, by the provision of a safety rim or buffer.

It has previously been suggested to employ such arrangements utilizing an inflated tube additional to the usual inner tube, but these suffer from the disadvantage that when the shoe picks up a nail or the like, it ordinarily will puncture the additional tube when the latter takes the load of the vehicle. In accordance with my invention, a safety rim or buffer made of solid rubber and fabric is employed, thereby obviating the difficulties attendant upon the attempted use of a pneumatic buffer.

It has also been suggested to form the shoe with an inwardly directed ring for taking the weight of the vehicle in the event of deflation, but such an arrangement necessitates a special shoe of complex construction, and robs the shoe of its desired flexibility. Such a shoe is inefficient because the flexure in ordinary use of the relatively thick structure would lead to large mechanical hysteresis losses, and the tire would heat up badly when running.

It has further been proposed to form a safety rim on the interior of the inner tube. This disregards the fact that the only practical form of the automobile pneumatic tire is that in which the air tube is a separable element from the shoe, and that the conditions for manufacture of perfectly air-tight and permanently flexible inner tubes are very severe and do not permit of such additions being made to the tube structure. In the practice of my invention, the inner tube may be a conventional inner tube, and even if specially formed for use with my safety buffer, the inner tube is conventional in the sense that it may be made of thin flexible high grade rubber of substantially uniform thickness, and be provided with a valve stem of the conventional type.

Numerous other proposals have been made, but in each case the suggested improvement necessitates considerable change in the construction of the shoe or/and the inner tube or/and the wheel upon which the tire is to be mounted, and in no case of which I am aware has any proposed safety device proved commercially successful.

Accordingly, one primary object of my invention resides in the provision of a safety rim or buffer for use with pneumatic, and particularly with balloon tires, which will not necessitate the use of a special shoe, nor the use of a special inner tube, and which will not reduce the resiliency, efficiency, and shock absorbing properties of the tire. This object I fulfill by substituting for the usual protective strip or flap which is placed around the inner periphery of the shoe in order to protect the inner tube from direct contact with the wheel rim, a safety rim or internal buffer comprising a solid rubber and fabric ring of generally wedge shaped cross-section. This ring, instead of being concave on its inner surface like the conventional flap, is convex, and projects well into the interior of the shoe, that is, it extends radially outward beyond the flanges of the wheel rim. Should the tire become deflated the shoe will flatten only partially until it reaches the outer periphery of the buffer, thereby preventing the undesired extreme reduction in wheel diameter with its consequent danger.

A further object of the present invention is to overcome the tendency of the shoe to leave the wheel rim when deflated, and with this in view the base portion of the internal buffer is so shaped that the central portion thereof rests directly on the wheel rim while the edge portions thereof rest against the inner surface of the beads of the shoe in order to hold the shoe on the wheel rim.

Another object of the present invention is to prevent injury to the inner tube near the valve stem when running on the safety rim, and this is accomplished by providing the safety rim or internal buffer with a recess for protectively receiving the inner end of the valve stem.

A further object of the present invention is to provide against the rotational stress which may be set up between the wheel and the buffer when the wheel is rotated by the engine or is held back by the brake. This object I fulfill by providing the buffer with spaced metallic inserts and cooperating locking means for anchoring the buffer to the wheel rim. These inserts are preferably so shaped that the locking action helps anchor the shoe onto the rim, as well as takes driving or braking stress.

Further features of my invention deal with the texture or nature of reinforcement of the safety rim or internal buffer. The base portion of the buffer is strongly reinforced by a plurality of closely spaced layers of fabric. These layers of fabric are preferably made with strong threads in the circumferential direction in order to prevent expansion of the buffer under centrifugal force, and to prevent longitudinal creeping when accelerating or decelerating force is applied to the wheels. This reinforcement of the base portion of the buffer serves to strengthen it for its function of holding the beads of the shoe against the wheel rim, and further serves as a secure medium in which the aforementioned metallic inserts may be imbedded. This reinforcement also serves to prevent an undesired change in the shape of the base portion of the buffer when it is loaded with the weight of the vehicle.

A further object of the present invention is to make the safety rim or buffer of minimum weight, minimum cross-section, and maximum resiliency. This is done, generally, by taking advantage of the fact that the safety rim does not normally support a load, and its period of use ordinarily is relatively infrequent and relatively short in duration, and therefore placing all sections of the rubber in the safety rim except the base portion previously described, under a maximum and uniformly high distortion when loaded. Structurally, this is accomplished by building up the buffer of layers of rubber cemented together with reinforcing strips of fabric therebetween. The threads of the fabric are made relatively sparse and weak in a circumferential direction, but relatively strong in a transverse direction. The spacing of the reinforcing strips is made relatively great. In this way each of the layers may be subjected to considerable distortion and loading, while the strong transverse reinforcement causes the inner layers to be subjected to loading similar to that of the outer layers of rubber.

If the tire assembly so far described is run in a deflated condition for a considerable period of time a great deal of wear occurs on the inner tube. This is caused by the greater circumferential dimension of the shoe relative to that of the buffer, which leads to the buffer having a greater angular velocity than that of the shoe. In consequence, the shoe tends to gather or bunch in front of the wheel, and a constant slippage must take place between the buffer and the shoe in order to relieve this accumulation of shoe material.

This difficulty is partially overcome by the structure already described, in which the circumferential reinforcement of the outer portion of the safety rim or buffer is made relatively weak. In fact, the circumferential strands should preferably be made so weak as to easily break when the load is placed on the safety rim, for this increases the circumferential resiliency of the safety rim. I have found that if the outer layers of rubber on the buffer be permitted to expand circumferentially when placed under compression the angular velocity of the wheel is reduced or, in other words, the wheel behaves as though its diameter were commensurate with a circumference based upon the expanded segment of circumference upon which the wheel rests. The circumferential expansion of the buffer in effect elongates the periphery thereof at the portion which is in contact with the deflated shoe, and in this manner the angular velocity of the wheel may be reduced to accurately correspond with that of the deflated shoe.

Another manner in which this desired result may be obtained is to transversely slot the periphery of the buffer. In this manner the tread of the buffer consists of separate rectangles which are each quite flexible in a circumferential direction, and which may yield circumferentially independently of the adjacent sections of the periphery of the buffer. Without these transverse slots the circumferential tension in the rubber supporting the vehicle weight might be communicated to the new rubber coming into compression as the wheel rotates, and in this manner the circumferential tension might be cumulatively increased until slippage occurred.

To the accomplishment of the foregoing and such other objects as will hereinafter appear, my invention consists in the elements and their relation one to the other as hereinafter are more particularly described in the specification and sought to be defined in the claims. The specification is accompanied by drawings in which:

Fig. 1 is a section through a tire assembly embodying my invention;

Fig. 2 is a section taken through the tire assembly at the valve stem;

Fig. 3 is a partially sectioned elevation and a wheel and tire assembly embodying the invention; and Fig. 4 is a fragmentary section through a safety rim or buffer under compression.

Referring to the drawings, the tire assembly consists of an outer shoe 2, an inner tube 4, a buffer 6, a wheel rim 8, and a wheel 10.

As is clear from the drawings, the shoe 2 is of conventional type which may be designed for high efficiency, long life, and great flexibility. The shoe is preferably of the low pressure or balloon type having a relatively large air chamber and relatively thin walls, although my invention is also applicable to ordinary high pressure pneumatic tires. The inner tube 4 may be of the conventional type, employing a relatively thin high grade rubber of substantially uniform thickness and great flexibility. In the case of inner tubes of more expensive manufacture which are tailored or preformed to the desired annular shape, the tubes intended for use with the present invention may be preformed with a cross-sectional shape corresponding to that shown in Fig. 1 of the drawings, that is, the annular indentation caused by the buffer 6 may be allowed for in advance. Even such a shaped inner tube I consider to be a conventional inner tube in every material respect, because it is designed and may be manufactured with a special view to being air-tight and flexible. The inner tube 4 is provided with a valve stem 12 of the usual type, and the tube is made of rubber of substantially uniform thickness, except for such strengthening as may be customary as, for example, the thickened area 14 adjacent the point of attachment of the valve stem 12 to the inner tube.

The safety rim or internal buffer 6 is placed inside of the beads 16 of the shoe and between the inner tube 4 and the wheel rim 8, and serves to replace the strip or flap now used in the same position to prevent the inner tube from pinching between the edges or beads of the shoe 16 and the rim 8, and to prevent chafing of the inner tube against the rim and exposure to rust on the rim, and so on. The buffer is provided with an aperture 18 for the valve stem 12, and the periphery is recessed as at 20 in order to form a protective seat for the inner end of the valve stem. If the recess 20 were not provided the full weight of the vehicle would be applied to the inner end of the valve stem when the shoe is deflated, and this would crush or shear the valve stem flange and the section of rubber 14, and so ruin the inner tube. As here disclosed, the buffer is preferably a closed annular rim, but it will be understood that if desired it may be made in the form of a strip having overlapping ends of reduced cross-section, preferably located at the valve stem aperture 18, in still closer resemblance to the usual protective flap now used.

As is evident from the drawings, the safety buffer 6 comprises a base portion 22, and an outer portion 24. The base portion 22 is so shaped that the central portion 26 thereof rests upon the wheel rim 8, while the edge portions 28 thereof rest against the inner surface of the beads or edge walls 16 of the shoe 2. In this manner the buffer tends to hold the shoe 2 on the wheel rim 8 not only when the tube is inflated but also when it is deflated. The base portion 22 is reinforced with a plurality of closely spaced layers of fabric, and these serve to strengthen the base portion so that it will retain the desired shape even when the buffer 6 is loaded with the weight of the vehicle. The reinforcing layers are preferably made with strong circumferential threads in order to give the buffer considerable circumferential strength so as to prevent its expansion under centrifugal force when rotating at high speeds, and to prevent longitudinal creeping when accelerating or decelerating force is applied to the wheel 10.

To properly hold the shoe on the rim when the tire is deflated is not a simple problem. When a tire which is not rotating becomes flat it will be found that the walls of the shoe bend inward and depart from the edges or flanges of the wheel rim at either side of the portion of the shoe upon which the vehicle is resting. When the wheel is rotating this condition becomes rapidly aggravated because the portion of the shoe having the inwardly bent walls is rolled beneath the rim and this tends to draw the walls of the next approaching portion of the shoe still further away from the edges of the rim, the action being cumulative. The resulting accumulation of material causes a lumping or bunching of the shoe which causes the wheel to bump. This bumping should be distinguished from that caused by gathering or bunching of the shoe in front of the wheel due to the difference in radius of the rim and the shoe, which problem is considered later.

It should be noted that in the safety buffer 6 of my invention the base portion 22 is sufficiently wide to extend along the inner edge walls of the shoe 2 to points opposite the edges 9 of the flanges of the wheel rim 8. With this arrangement direct pressure due to the weight of the vehicle on the periphery of the buffer 6 is transmitted to the bottom or edge walls of the shoe 2 and holds them securely against the rim 8 all the way out to the edges 9 thereof. Initial bending inward of the walls of the shoe away from the flanges of the wheel rim is prevented, and consequently cumulative departure or bending in of the shoe walls is also prevented, so that one source of bunching of the shoe and bumping of the wheel, with its concomitant wear of the shoe and its tendency to cause the shoe to leave the rim is entirely overcome.

This advantage may be made still more effective by the use of metallic anchoring inserts 30. The safety rim or buffer is preferably provided with a plurality of such inserts spaced equally around the rim. In the present case six are provided, and ordinarily this number will suffice. These inserts are threaded to receive bolts 32, which may be threaded into the inserts 30 through apertures 31 provided in the wheel rim 8. The apertures may be and preferably are made in the form of longitudinally directed slots, so as to allow for slight irregularities in the location of the metallic inserts. The metallic inserts should include transversely extending wings 34 of generous dimension, and may desirably be provided with apertures 35, thru which the rubber is vulcanized. The wings 34 permit the locking bolts 32 to draw the base portion 22 of the buffer directly against the beads 16 of the shoe, thereby securely anchoring the shoe to the rim even when deflated. The anchorage of the metallic inserts 30 in the safety rim is strengthened by the fabric reinforcement of the base portion 22 of the safety rim, and the locking bolts 32 serve to take the driving or braking forces when the vehicle is running on the safety buffer.

The wheel rim 8 in the present case is illustrated as being a demountable rim which may be removed from the felloe 36 of the wheel 10. The outer edge of the felloe 36 is provided with recesses 38 which permit the demountable rim 8 to be slid onto the wheel 10 without the heads of the bolts 32 being obstructed by the outer edge of the wheel felloe. These recesses may be concealed by the lugs 40, used to anchor the demountable rim on the wheel 10. It will be understood that the rim 8, instead of being demountable, may be a part of a completely demountable wheel, such as a wire wheel, disc wheel, or the like, or need not be demountable.

The outer portion 24 of the safety buffer is designed to be of minimum weight and minimum cross-section for its purpose. The buffer normally supports no load except the aid pressure, and ordinarily undergoes no deflation. Its use under load is limited to a relatively short period of time, and only at relatively infrequent occasions. The rubber of the buffer may, therefore, be subjected to maximum distortion to an extent which, if the rim were used continuously like an ordinary shoe, would result in excessive internal heating due to mechanical hysteresis.

As shown in the drawings, the safety rim or buffer is made up of alternate layers of rubber and fabric. The fabric may be a canvas or a cord fabric, and is preferably of sufficiently open weave to permit an intimate bond between the rubber and the canvas, and between the rubber layers on either side of each strip of canvas. The weave is one which results in considerable strength transversely of the safety rim, that is, in the direction parallel to the axis of rotation of the wheel. The strips are therefore preferably cut so that the stronger threads are perpendicular to the edges of the strips. As is best illustrated in Fig. 4, these transverse threads distribute the load upon the buffer, causing the inner layers 42 to be distorted or bulged, the same as the outer layers 44. The thickness of the rubber layers is properly related to the width or axial dimension of the layers to permit of the desired distortion or bulge. In this manner the buffer may have the desired resiliency which would be lost if the rubber layers were made too thin. On the other hand, if these layers are made too thick and the bulge becomes too pronounced the entire body of rubber is not stressed uniformly, and the ratio of load carrying capacity to the total weight of rubber in the safety buffer is reduced.

The circumferential strands of the fabric in the outer portion 24 of the buffer are preferably widely spaced and relatively weak. Their primary function is merely to support the transverse threads, and to space them while the fabric is being vulcanized into the buffer. The circumferential threads are made so weak that they may readily rupture on being subjected to tension, caused by the buffer taking the vehicle load. This construction permits the buffer to expand circumferentially when placed under compression, and this is equivalent in effect to an elongation of the periphery of the buffer. I have found that in this manner the angular velocity of the wheel may be made lower than that equivalent to the apparent radius of the buffer, and the circumferential expansion may be adjusted to result in an angular velocity commensurate with that of the deflated shoe. This reduces the excessive wear which might otherwise take place when riding on a deflated shoe.

The circumferential threads may be made particularly weak in the outer layers of fabric, and the number of layers of fabric, beginning at the periphery of the safety rim and going toward the base portion of the same, which are made with circumferential threads of negligible strength helps determine the amount of circumferential expansion which the safety rim will experience when loaded. This should preferably be adjusted to cause the angular velocity of the wheel to correspond as accurately as possible to the angular velocity of the deflated shoe. For example, if the shoe is of relatively large cross-section, compared with the wheel diameter, thereby causing considerable difference in the angular velocity of the wheel when deflated, I make the safety rim highly expansive in the circumferential direction by providing extremely weak circumferential threads in a plurality of the outer layers of reinforcing fabric. On the other hand, if the cross-section of the tire is small, relative to the wheel diameter, only the outermost layer of reinforcing fabric may be made with no circumferential reinforcement. In this manner when the buffer takes the vehicle load the outer portion of the same for a given radial angle expands circumferentially to a length equal to that of the periphery of the shoe over the same radial angle.

As a final precaution intended to obviate wear of the inner tube, when the tire assembly is run in the deflated condition the periphery of the safety buffer 6 may be transversely slotted as at 50. These slots cause the buffer to have a tread of its own, consisting of rectangular areas of rubber separated by relatively large expansion spaces. The curvature of the edges of the slots and the width of the slots are made sufficiently great to prevent the inner tube 4 from being too sharply bent and from being pinched between adjacent segments of the tread of the buffer.

This slotted construction prevents gathering or bunching of the shoe in front of the wheel, and relieves the accumulation of the material of the shoe which might otherwise take place. This phenomenon may be explained on the theory that each of the independent tread areas may be separately distorted, and the necessary slippage between the safety rim and the shoe may be allowed for between the successive tread areas. Each tread area may expand circumferentially independently of the adjacent tread areas. The circumferential displacement of the rubber under compression therefor cannot be communicated to the tread areas next coming into compression, and no cumulative distortion of the rubber of the safety rim can therefore take place.

The depth of the slots 50 is preferably made less than the thickness of the outermost layer of rubber in order not to cut through the outermost layer of fabric, but this is not a necessary condition for, as was previously explained, the transverse threads of the outermost layer of fabric are the only threads which are usefully employed.

From the foregoing description, the manner of constructing and using, and the many advantages of my safety rim or internal buffer, will be apparent. The shoe and inner tube are of ordinary construction, and therefore will possess all of the operating advantages so far developed in this art. The wheel rim will, if no metallic inserts are used in the safety buffer, also be of ordinary construction, and if the metallic inserts are used in the buffer as preferred, the wheel rim will differ from the ordinary rim only in being provided with a plurality of spaced apertures with which the locking means may cooperate. The safety rim or buffer itself is of relatively economical construction, particularly if it is kept in mind that by its use the protective flap or strip ordinarily needed may be dispensed with. The buffer does not interfere with the ordinary shock absorbing action of the pneumatic tire, but in the event of a puncture or blow-out, prevents dangerous reduction in wheel diameter, and prevents bunching of the shoe in front of the wheel rim, and prevents the shoe from leaving the wheel rim, all of which factors make it possible to run on the buffer a reasonable distance to find a convenient location or, if desired, a service station to make the necessary repair. In a severe emergency, as in the case of a very badly torn shoe and no spare tire available, the shoe may be ripped from the wheel rim, and the safety rim will alone be useful as a solid tire for a short distance. When the shoe is deflated the wheel is nevertheless capable of accommodating driving or braking forces, and the inner end of the valve stem is protected against injury. Wear of the deflated inner tube, and bunching of the collapsed shoe in front of the buffer, are prevented not only by the large diameter of the buffer relative to that of the wheel rim, but also by the precautions permitting circumferential expansion of the buffer previously described.

It will be apparent that while I have shown and described my invention in the preferred form, many changes and modifications may be made in the structure disclosed without departing from the spirit of the invention, defined in the following claims.

I claim:

1. A safety buffer for pneumatic tires comprising a continuous ring made of solid rubber and fabric and having a generally wedge-shaped cross section the base portion of which is broad and so shaped that the central portion thereof will rest directly on a conventional wheel rim while the edge portions thereof will rest against a wide portion of the inner surface of the beads of a conventional shoe in order to hold the shoe on the wheel rim, and the outer portion of which extends radially beyond the wheel rim flanges and is not reinforced in a circumferential direction, and is generally designed to permit of a large amount of circumferential expansion.

2. A safety buffer for pneumatic tires comprising a continuous ring made of solid rubber and fabric and having a generally wedge-shaped cross section the base portion of which is broad and strongly reinforced by a plurality of closely spaced layers of fabric and shaped so that the central portion thereof will rest directly on a conventional wheel rim while the edge portions thereof will rest against a wide portion of the inner surface of the beads of a conventional shoe in order to hold the shoe on the wheel rim, and the outer portion of which extends radially beyond the wheel rim flanges and is strongly reinforced solely in a transverse direction by widely spaced layers of fabric.

3. A safety buffer for conventional pneumatic balloon tires comprising a continuous ring made of solid rubber and fabric and having a generally wedge-shaped cross section the base portion of which is broad and strongly reinforced by a plurality of closely spaced layers of fabric and shaped so that the central portion thereof will rest directly on the wheel rim while the edge portions thereof will rest against a wide portion of the inner surface of the beads of the shoe in order to hold the shoe on the wheel rim, the outer portion of the buffer extending radially beyond the wheel rim flanges and being strongly reinforced solely in a transverse direction by widely spaced layers of fabric, and the buffer being provided with an aperture for the valve stem of an inner tube and a recess localized at the aperture for protectively receiving the inner end of the valve stem.

4. A safety buffer for conventional pneumatic balloon tires comprising a continuous ring made of solid rubber and fabric and having a generally wedge-shaped cross section the base portion of which is broad and strongly reinforced by a plurality of closely spaced layers of fabric and shaped so that the central portion thereof will rest directly on the wheel rim while the edge portions thereof will rest against a wide portion of the inner surface of the beads of the shoe in order to hold the shoe on the wheel rim, the outer portion of the buffer extending radially beyond the wheel rim flanges and being strongly reinforced solely in a transverse direction by widely spaced layers of fabric, the outermost layer of rubber being transversely slotted around the periphery of the buffer, and the buffer being provided with an aperture for the valve stem of an inner tube and a recess localized at the aperture for protectively receiving the inner end of the valve stem.

5. A safety buffer for pneumatic balloon tires comprising a continuous ring of solid rubber and fabric and having a generally wedge-shaped cross section the base portion of which is provided with spaced metallic inserts and cooperative locking means for anchoring the buffer to a wheel rim, the outer portion of the buffer extending radially beyond the wheel rim flanges and being strongly reinforced solely in a transverse direction by widely spaced layers of fabric, the outermost layer of rubber being transversely slotted around the periphery of the buffer, and the buffer being provided with an aperture for the valve stem of an inner tube and a recess localized at the aperture for protectively receiving the inner end of the valve stem.

6. A safety buffer for conventional pneumatic balloon tires comprising a continuous ring made of solid rubber and fabric and having a generally wedge-shaped cross section the outer portion of which extends radially beyond the wheel rim flanges and the base portion of which is broad and strongly reinforced by a plurality of closely spaced layers of fabric and shaped so that the central portion thereof will rest directly on the wheel rim while the edge portions thereof will rest against a wide portion of the inner surface of the beads of the shoe in order to hold the shoe on the wheel rim, and is provided with spaced metallic inserts held in the aforesaid layers of fabric and cooperating locking means for anchoring the buffer to the wheel rim.

7. A safety buffer for conventional pneumatic balloon tires comprising a continuous ring made of solid rubber and fabric and having a generally wedge-shaped cross section the base portion of which is broad and strongly reinforced by a plurality of closely spaced layers of fabric and shaped so that the central portion thereof will rest directly on the wheel rim while the edge portions thereof will rest against a wide portion of the inner surface of the beads of the shoe in order to hold the shoe on the wheel rim, and is provided with spaced metallic inserts held in the aforesaid layers of fabric and cooperating locking means for anchoring the buffer to the wheel rim, the outer portion of the buffer extending radially beyond the wheel rim flanges and being strongly reinforced solely in a transverse direction by widely spaced layers of fabric, and the buffer being provided with an aperture for the valve stem of an inner tube and a recess localized at the aperture for protectively receiving the inner end of the valve stem.

8. An automobile wheel assembly comprising a conventional shoe, an air-tight inner tube made of flexible rubber of uniform thickness and provided with a valve stem of the conventional type, a solid rubber and fabric safety buffer in the form of a continuous ring of generally wedge-shaped cross section replacing the usual protective flap, and a wheel rim of conventional shape provided with a valve stem aperture, said buffer comprising an outer portion which extends radially beyond the wheel rim flanges, and a base portion which is broad and so shaped that the central portion thereof rests directly on the wheel rim while the edge portions rest on a wide portion of the inner surface of the beads of the shoe extending to points opposite the flanges of the rim so that pressure on the buffer is applied directly to the beads and the flanges in order to hold the shoe on the rim.

9. An automobile wheel assembly comprising a conventional shoe, an air-tight inner tube made of flexible rubber of uniform thickness and provided with a valve stem of the conventional type, a solid rubber and fabric safety buffer in the form of a continuous ring of generally wedge-shaped cross section replacing the usual protective flap, and a wheel rim of conventional shape provided with a valve stem aperture, said buffer comprising a base portion which is broad and strongly reinforced by a plurality of closely spaced layers of fabric and shaped so that the central portion thereof rests directly on the wheel rim while the edge portions rest on the inner surface of the beads of the shoe in order to hold the shoe on the rim, the outer portion of the buffer extending radially beyond the wheel rim flanges and being strongly reinforced solely in a transverse direction by widely spaced layers of fabric, the outermost layer of rubber being transversely slotted around its periphery, and the buffer being provided with an aperture for the valve stem of the inner tube and a recess localized at the aperture for protectively receiving the inner end of the valve stem.

10. An automobile wheel assembly comprising a balloon tire shoe, an air-tight inner tube made of flexible rubber of uniform thickness and provided with a valve stem of the conventional type, a solid rubber and fabric safety buffer in the form of a continuous ring of generally wedge-shaped cross section replacing the usual protective flap, and a wheel rim provided with a valve stem aperture and a plurality of additional slots spaced around the periphery of the rim, said buffer comprising an outer portion which extends radially beyond the wheel rim flanges and a base portion which is broad and strongly reinforced by a plurality of closely spaced layers of fabric, and which is so shaped that the central portion thereof rests directly on the wheel rim while the edge portions rest on a wide portion of the inner surface of the beads of the shoe in order to hold the shoe on the wheel rim, and which has spaced metallic inserts held in the aforesaid layers of fabric and locking means cooperating therewith and with the slots in the wheel rim for anchoring the buffer thereto, and the buffer being provided with an aperture for the valve stem of the inner tube and a recess localized at the aperture for protectively receiving the inner end of the valve stem.

11. A safety buffer for pneumatic tires comprising a solid continuous ring made of rubber and fabric to be placed between the inner tube and the wheel rim of a pneumatic tire assembly, said buffer extending radially outward beyond the flanges of the wheel rim and the periphery of said buffer being transversely slotted with a large number of small slots to form a substantially continuous tread which is highly resilient in a circumferential direction.

12. A safety buffer for pneumatic tires comprising a solid continuous ring made of rubber and fabric to be placed between the inner tube and the wheel rim of a pneumatic tire assembly, said buffer extending radially outward beyond the flanges of the wheel rim and comprising a base portion, an intermediate portion, and a peripheral portion, the peripheral portion being slotted with a large number of small slots to form a substantially continuous tread which is highly resilient in a circumferential direction, the intermediate portion being reinforced solely against transverse expansion, and the base portion being reinforced against circumferential expansion.

13. A safety buffer for pneumatic tires comprising a solid ring made of rubber and fabric having a base portion and an outer portion, said outer portion extending radially beyond the wheel rim flange and comprising alternate layers of rubber and fabric, the strong threads of the fabric extending transversely of the buffer in order to limit the compressibility of each of the layers of rubber, and the layers of rubber having a relative thickness predetermined to cause approximately equalized maximum distortion in each layer thereof when the buffer is loaded.

14. A safety buffer for pneumatic tires comprising a solid rubber and fabric continuous ring of generally wedge-shaped cross section having a base portion and an outer portion, said base portion being strongly reinforced in a circumferential direction by a plurality of closely spaced layers of fabric, and said outer portion extending radially beyond the wheel rim flanges and comprising alternate layers of rubber and fabric, a plurality of the layers of fabric in the outer portion having different strengths in a circumferential direction, and the circumferential strength of the outermost layer of fabric being negligible.

15. An automobile wheel assembly comprising a shoe, an air-tight inner tube, a wheel rim, a safety buffer including a continuous ring of solid rubber and fabric of generally wedge-shaped cross section to be placed between the inner tube and the wheel rim, said buffer having a base portion strongly reinforced in a circumferential direction by a plurality of closely spaced layers of fabric, and an outer portion which extends radially beyond the wheel rim flanges and is so proportioned that when taking the vehicle load it expands circumferentially to a length substantially equal to that of the periphery of the shoe for a given radial angle.

Signed at New York in the county of New York and State of New York this 11th day of December A. D. 1929.

LESTER L. JONES.